(12) United States Patent
Levine et al.

(10) Patent No.: US 10,044,640 B1
(45) Date of Patent: Aug. 7, 2018

(54) DISTRIBUTED RESOURCE SCHEDULING LAYER UTILIZABLE WITH RESOURCE ABSTRACTION FRAMEWORKS

(71) Applicant: EMC Corporation, Hopkinton, MA (US)

(72) Inventors: Idit Levine, Belmont, MA (US); Scott D. Weiss, Oceanside, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 240 days.

(21) Appl. No.: 15/138,837

(22) Filed: Apr. 26, 2016

(51) Int. Cl.
*G06F 15/173* (2006.01)
*H04L 12/911* (2013.01)

(52) U.S. Cl.
CPC .......... *H04L 47/827* (2013.01); *H04L 47/78* (2013.01)

(58) Field of Classification Search
CPC .............................. H04L 47/827; H04L 47/78
USPC ........................................ 709/226, 224, 225
See application file for complete search history.

(56) References Cited

U.S. PATENT DOCUMENTS

| | | | | |
|---|---|---|---|---|
| 6,708,210 B2* | 3/2004 | Chang | .................. | G06F 9/54 709/223 |
| 7,386,662 B1* | 6/2008 | Kekre | ................. | G06F 3/0605 711/113 |
| 7,636,801 B1* | 12/2009 | Kekre | ............... | H04L 67/1097 709/218 |
| 8,959,173 B1* | 2/2015 | Robidoux | ........... | G06F 9/5088 709/201 |
| 9,621,428 B1* | 4/2017 | Lev | .................... | H04L 41/12 |
| 9,667,509 B1* | 5/2017 | Levi | .................. | H04L 41/5041 |
| 9,733,989 B1* | 8/2017 | Robidoux | ........... | G06F 9/5088 |
| 9,742,639 B1* | 8/2017 | Zhang | .................. | H04L 43/04 |
| 9,928,059 B1* | 3/2018 | Sartor | .................... | G06F 8/71 |
| 2006/0242226 A1* | 10/2006 | Hollebeek | ........... | G06F 19/321 709/203 |

(Continued)

OTHER PUBLICATIONS

B. Hindman et al., "Mesos: A Platform for Fine-Grained Resource Sharing in the Data Center," Proceedings of the 8th USENIX Conference on Networked Systems Design and Implementation (NSDI), Mar.-Apr. 2011, pp. 295-308.

(Continued)

*Primary Examiner* — Thu Ha T Nguyen
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement virtual resources for use by client applications. The processing platform is further configured with a multi-layered architecture including at least a client applications layer, a distributed resource scheduling layer, a resource abstraction layer and a resource layer comprising the virtual resources. The distributed resource scheduling layer registers as a framework with the resource abstraction layer, and the client applications register as respective processing tasks with the distributed resource scheduling layer. The distributed resource scheduling layer controls allocation of the virtual resources of the resource layer to the client applications. The virtual resources illustratively comprise respective containers, respective virtual machines, or combinations thereof.

20 Claims, 7 Drawing Sheets

(56) References Cited

U.S. PATENT DOCUMENTS

| | | | |
|---|---|---|---|
| 2007/0195787 A1* | 8/2007 | Alnuweiri | H04L 47/10 370/395.4 |
| 2010/0138843 A1* | 6/2010 | Freericks | G06F 9/542 719/318 |
| 2011/0072208 A1 | 3/2011 | Gulati et al. | |
| 2012/0260019 A1* | 10/2012 | Malaiyandisamy | G06F 9/5077 711/6 |
| 2013/0174174 A1 | 7/2013 | Jung et al. | |
| 2013/0179881 A1 | 7/2013 | Calder et al. | |
| 2014/0136779 A1 | 5/2014 | Guha et al. | |
| 2015/0012659 A1 | 1/2015 | Jackson | |
| 2016/0110313 A1* | 4/2016 | Prakash | G06F 17/2288 715/202 |
| 2016/0205518 A1* | 7/2016 | Patel | H04L 67/1002 455/518 |
| 2016/0337226 A1* | 11/2016 | Padala | H04L 43/10 |
| 2016/0378519 A1* | 12/2016 | Gaurav | G06F 9/5077 718/1 |
| 2017/0202005 A1* | 7/2017 | Madan | H04W 72/1231 |
| 2017/0270449 A1* | 9/2017 | Shrimali | G06F 17/11 |
| 2017/0373932 A1* | 12/2017 | Subramanian | H04L 41/22 |
| 2018/0114013 A1* | 4/2018 | Sood | G06F 21/53 |
| 2018/0129665 A1* | 5/2018 | Bach | G06F 17/30091 |

OTHER PUBLICATIONS mesosphere.com, "Why Mesos?" https://mesosphere.com/why-mesos/, Apr. 1, 2016, 7 pages.

* cited by examiner

DISTRIBUTED RESOURCE SCHEDULING LAYER UTILIZABLE WITH RESOURCE ABSTRACTION FRAMEWORKS

FIELD

The field relates generally to information processing systems, and more particularly to techniques for provisioning resources in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system. However, significant challenges can arise in the deployment of containers. For example, a need exists for improved scheduling techniques for allocating container resources of virtualization infrastructure across multiple otherwise unrelated client applications. Similar challenges can arise in the allocation of other types of virtual resources, such as virtual machines.

SUMMARY

Illustrative embodiments of the present invention provide a distributed resource scheduling layer utilizable with one or more resource abstraction frameworks of a processing platform comprising multiple processing devices.

In one embodiment, an apparatus comprises a processing platform that includes a plurality of processing devices each comprising a processor coupled to a memory. The processing platform is configured to implement virtual resources for use by client applications. The virtual resources illustratively comprise respective containers, but may additionally or alternatively comprise respective virtual machines or other types of virtual resources, or combinations of multiple such resources. The processing platform is further configured with a multi-layered architecture including at least a client applications layer, a distributed resource scheduling layer, a resource abstraction layer and a resource layer comprising the virtual resources. The distributed resource scheduling layer registers as a framework with the resource abstraction layer, and the client applications register as respective processing tasks with the distributed resource scheduling layer. The distributed resource scheduling layer controls allocation of the virtual resources of the resource layer to the client applications.

Illustrative embodiments can provide significant advantages relative to conventional resource scheduling arrangements. For example, challenges associated with deployment of container resources and other virtual resources in a wide variety of contexts can be advantageously avoided through the use of a distributed resource scheduling layer utilizable with one or more resource abstraction frameworks of a processing platform.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
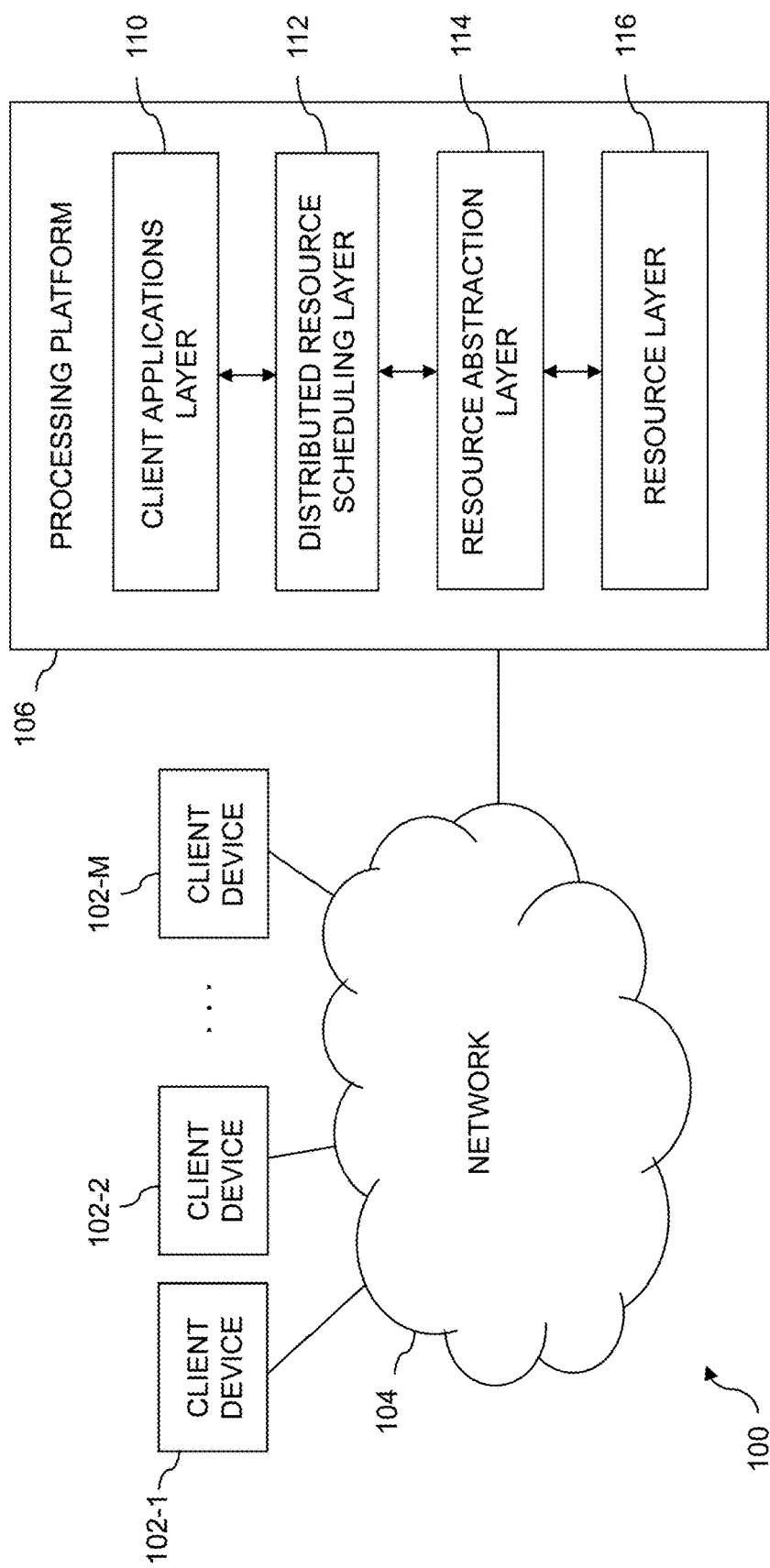
FIG. 1 is a block diagram of an information processing system comprising a distributed resource scheduling layer utilizable with a resource abstraction framework of a processing platform in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective client applications utilizing the processing platform 106. For example, such clients may be respective tenants of a cloud data center or other type of multi-tenant environment provided by the processing platform 106. These tenants or other clients are also referred to herein as respective "users" of the processing platform 106.

The network 104 illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processing platform 106 is assumed to include a plurality of processing devices each having a processor coupled to a memory, and is configured to implement virtual resources for use by client applications. The processing platform 106 comprises a multi-layered architecture including at least a client applications layer 110, a distributed resource scheduling layer 112, a resource abstraction layer 114 and a resource layer 116 comprising the virtual resources. For example, in some embodiments, the virtual resources comprise a plurality of containers allocable to respective client applications of the client applications layer 110 under the control of the distributed resource scheduling layer 112.

Additional or alternative virtual resources that may be used in a given embodiment include virtual machines. For example, the virtual resources may comprise a plurality of virtual machines allocable to respective ones of the client applications of the client applications layer 110 under the control of the distributed resource scheduling layer 112. Various combinations of containers, virtual machines and other virtual resources may be used in other embodiments. For example, virtual resources may comprise containers running in virtual machines.

The resource abstraction layer 114 in the present embodiment is assumed to comprise one or more resource abstraction frameworks such as a Mesos framework or a Cloud Foundry Diego framework. A given such framework abstracts away underlying virtual resources of the resource layer 116 from client applications that utilize those virtual resources so as to allow fault tolerant and elastic distributed systems to be more easily and efficiently built and run. However, conventional arrangements utilizing such resource abstraction frameworks are problematic in certain respects.

For example, in such conventional arrangements, scheduling is usually local to the client applications, such that one client application trying to leverage the resource abstraction framework may be unaware of other client applications also trying to leverage that framework. This can lead to inefficient allocation of the virtual resources, in that one client application may be allocated a resource that would be better utilized by another client application. Also, resource abstraction frameworks such as Mesos typically utilize a static reservation system to determine resource allocation between clients, and the static reservations are not variable in a dynamic manner based on client application processing loads. Moreover, resource abstraction frameworks such as Mesos typically cannot switch between different scheduling algorithms responsive to user input or under other conditions.

Other known frameworks such as Fenzo can be layered above Mesos in an attempt to address some of the above-noted problems, but an arrangement of this type would introduce additional problems. For example, the Fenzo Java class library does not work for all types of Mesos clients and as a result some clients would need to reconfigure their applications to integrate with Fenzo. Moreover, Fenzo clients in such an arrangement cannot interoperate with other Mesos clients that are running in non-Fenzo frameworks.

Additional drawbacks of conventional resource abstraction frameworks such as Mesos include an inability to support live migration of a given client application to different underlying Mesos resources, and an inability to dynamically recognize the need for additional hardware resources and reallocate responsive to such recognition.

These and other problems of conventional resource abstraction frameworks are not limited to the Mesos and Fenzo frameworks, but can instead more generally arise in other resource abstraction frameworks, including Cloud Foundry Diego frameworks.

The distributed resource scheduling layer 112 in the present embodiment is advantageously configured in a manner that overcomes the above-noted problems, as will be described in more detail below. As a result, the limitations associated with conventional Mesos or Fenzo implementations are avoided, and virtual resources can be more efficiently utilized within the system 100.

In operation, the distributed resource scheduling layer 112 registers as a framework with the resource abstraction layer 114, and the client applications of the client applications layer 110 register as respective processing tasks with the distributed resource scheduling layer 112. The distributed resource scheduling layer 112 then controls allocation of the virtual resources of the resource layer to the client applications. For example, the distributed resource scheduling layer 112 can support live migration of a given client application between containers, virtual machines or other sets of virtual resources.

In some embodiments, the distributed resource scheduling layer 112 provides a graphical user interface that allows a user to "drag-and-drop" a given client application from one container to another or from one virtual machine to another. The distributed resource scheduling layer 112 responds to such user input by implementing the requested movement of the given client application. For example, the distributed resource scheduling layer 112 can pause a given one of the applications utilizing a first container resource and restart the given application utilizing a second container resource so as to migrate the given application from the first container resource to the second container resource.

The distributed resource scheduling layer 112 therefore advantageously overcomes the lack of live migration functionality in the Mesos framework. For example, the distributed resource scheduling layer 112 can essentially pause the current execution of a given application, and access the underlying Mesos framework to create another execution instance for the given application but utilizing different virtual resources, thereby in effect performing a live migration of the given application.

The distributed resource scheduling layer 112 in the present embodiment is assumed to be configured to support a plurality of distinct scheduling algorithms. Moreover, the distributed resource scheduling layer can dynamically switch between utilization of different ones of the scheduling algorithms in scheduling processing operations for different ones of the client applications. For example, the distributed resource scheduling layer 112 can switch between simple scheduling algorithms such as round-robin scheduling to more complex distributed scheduling algorithms such as stack algorithms.

Additionally or alternatively, the distributed resource scheduling layer 112 can be configured to dynamically adjust portions of the virtual resources allocated to different ones of the client applications as a function of relative processing loads of the respective different ones of the client applications.

The distributed resource scheduling layer 112 therefore provides client-aware, efficient resource scheduling in the system 100. A wide variety of different scheduling algorithms can be incorporated into or otherwise made accessible to the distributed resource scheduling layer 112 and utilized to facilitate optimal utilization of the resources of the processing platform 106. The distributed resource scheduling layer 112 is advantageously aware of the compute needs of each of the clients and can determine the appropriate allocation of resources to individual clients based on this knowledge. Moreover, its allocation decisions can be dynamically altered as a function of client processing loads. For example, an initial allocation of 80-20 for a given set of virtual resources shared between Marathon and Chronos applications can be dynamically modified to run at an alternative 50-50 allocation.

The distributed resource scheduling layer 112 in the present embodiment is configured to present to the client applications an application programming interface (API) that is substantially the same as that which would otherwise be presented to the client applications by the resource abstraction layer 114 if the distributed resource scheduling layer 112 were removed from the multi-layered architecture. Thus, for example, in an embodiment in which the resource abstraction layer 114 comprises a Mesos framework, the API presented by the distributed resource scheduling layer 112 to the client applications could be substantially identical to that presented by the Mesos framework to the client applications. Accordingly, the functionality of the distributed resource scheduling layer 112 can be made accessible in such an embodiment to any client that can connect to the Mesos framework.

The processing platform 106 can be implemented at least in part utilizing converged infrastructure. Such converged infrastructure may comprise at least portions of VxRail™ VxRack™ or Vblock® converged infrastructure commercially available from VCE, the Virtual Computing Environment Company, an EMC Federation Company of the EMC Corporation of Hopkinton, Mass.

It is to be appreciated that the particular multi-layer architecture illustrated in the FIG. 1 embodiment is presented by way of example only, and that other embodiments can utilize other arrangements of more or fewer layers. For example, functionality disclosed herein as being associated with two or more separate layers can in other embodiments be combined into a single layer.

As mentioned previously, the virtual resources implemented by the resource layer 116 of the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more containers. Each of the container host devices illustratively comprises at least one processor coupled to a memory. Such host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes.

The processing platform 106 illustratively incorporates one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the distributed resource scheduling layer 112 or resource abstraction layer 114, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the distributed resource scheduling layer 112 is made available to a user by a cloud service provider on a Software-as-a-Service (SaaS) basis. Such users may be associated with respective ones of the client devices 102 and may correspond to respective tenants of the cloud service provider. However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 6 and 7. A given such processing platform comprises at least one processing device comprising a processor coupled to a memory, and the processing device may be implemented at least in part utilizing one or more virtual machines or other virtualization infrastructure.

The operation of the information processing system 100 will now be described in further detail with reference to the flow diagram of FIG. 2. The process as shown includes steps 200 through 208, and is suitable for use in the system 100 but is more generally applicable to other systems comprising a processing platform having a multi-layered architecture having a distributed resource scheduling layer and one or more associated resource abstraction layers. Accordingly, references to components of the embodiment of FIG. 1 in the process description below should not be viewed as limiting in any way, as the disclosed process steps can be applied in a wide variety of other types of information processing systems.

In step 200, virtual resources are implemented within a processing platform for use by client applications. As mentioned previously, such virtual resources illustratively comprise containers, virtual machines or combinations thereof. For example, in the context of the FIG. 1 embodiment, the virtual resources may comprise a plurality of containers allocable to respective ones of the client applications of the client applications layer 110 under the control of the distributed resource scheduling layer 112. As another example, the virtual resources may comprise a plurality of virtual machines allocable to respective ones of the client applications of the client applications layer 110 under the control of the distributed resource scheduling layer 112. Numerous other arrangements of virtual resources of various types and combinations can be utilized in other embodiments.

In step 202, the processing platform is configured with a multi-layered architecture including at least a client applications layer, a distributed resource scheduling layer, a resource abstraction layer and a resource layer comprising the virtual resources. An example of such a multi-layered architecture is that shown in the context of the FIG. 1 embodiment, illustratively comprising client applications layer 110, distributed resource scheduling layer 112, resource abstraction layer 114 and resource layer 116. Numerous other arrangements of additional or alternative layers can be used in implementing a multi-layered architecture in other embodiments. These other arrangements illustratively include at least one distributed resource scheduling layer interfacing with one or more resource abstraction layers.

In step 204, the distributed resource scheduling layer is registered as a framework with the resource abstraction layer. It is assumed in this embodiment that the resource abstraction layer provides resource abstraction support for multiple distinct frameworks, each of which must register with the resource abstraction layer.

In step 206, the client applications are registered as respective processing tasks with the distributed resource scheduling layer.

In step 208, the distributed resource scheduling layer is utilized to control allocation of the virtual resources of the resource layer to the client applications.

Figure 3:
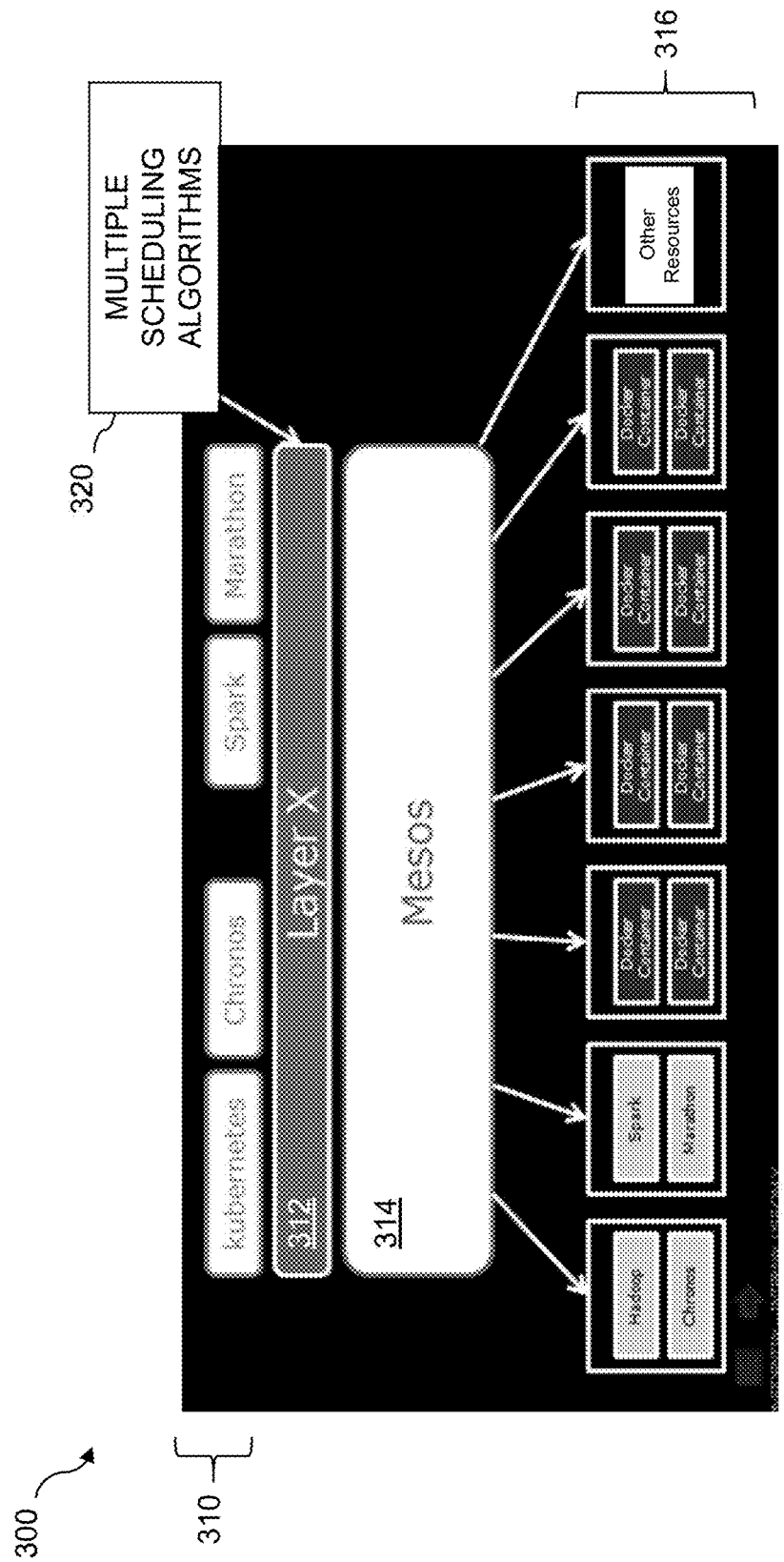
FIGS. 3, 4 and 5 show other illustrative embodiments of information processing systems having multi-layered architectures including a distributed resource scheduling layer.
Figure 4:
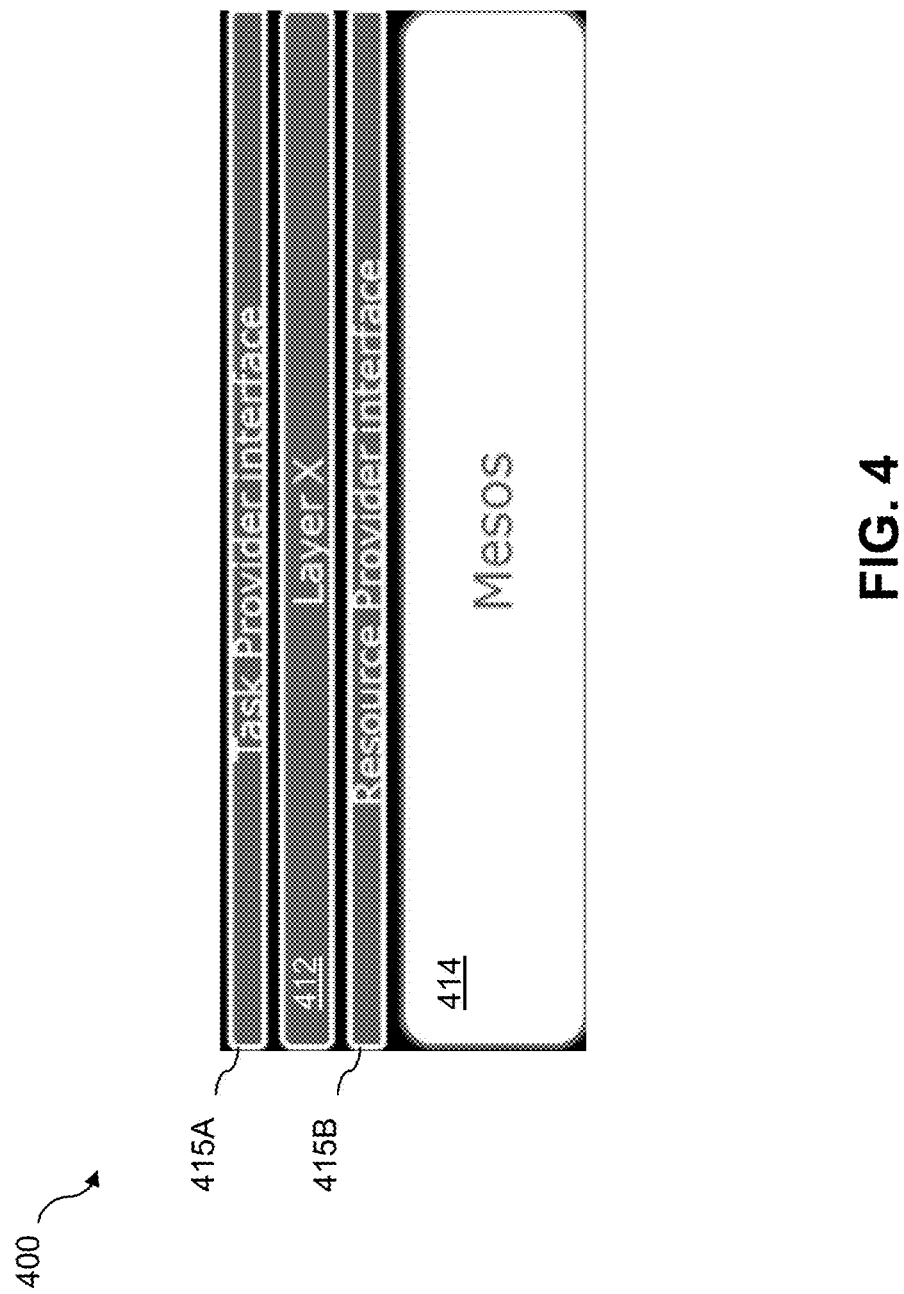
Figure 5:
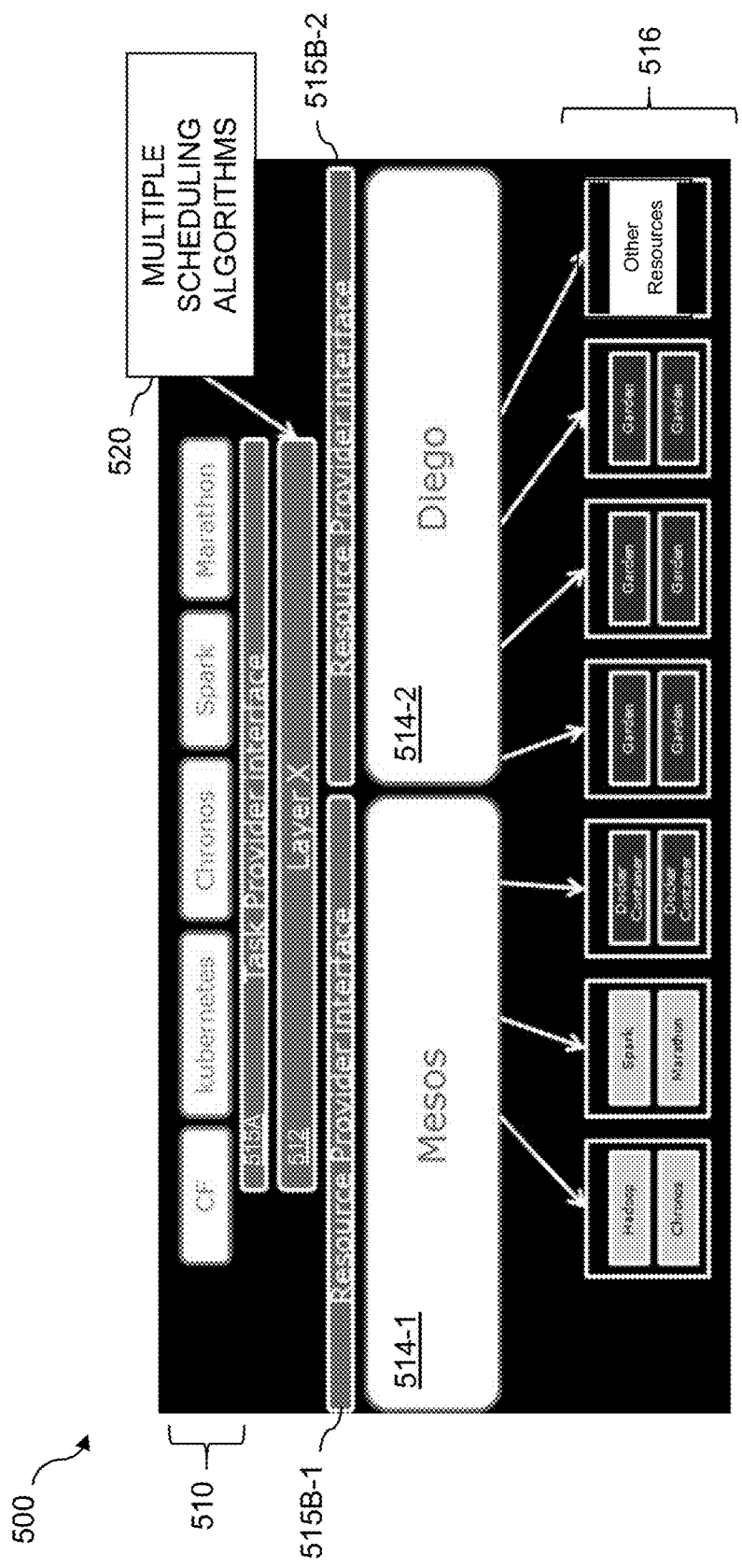

In illustrative embodiments to be described in conjunction with FIGS. 3 through 5, a given resource abstraction layer comprises a Mesos layer. The distributed resource scheduling layer in these embodiments is referred to as "Layer X," and resides between the Mesos layer and multiple client applications. Again, numerous alternative arrangements of multi-layered architectures are possible.

The controlled allocation of the virtual resources to the client applications in some embodiments involves dynamically adjusting in the distributed resource scheduling layer portions of the virtual resources allocated to different ones of the client applications as a function of relative processing loads of the respective different ones of the client applications.

Such dynamic adjustment in some cases involves migrating a given application between different virtual resources. For example, in an embodiment in which the virtual resources comprise a plurality of containers allocable to respective ones of the client applications under the control of the distributed resource scheduling layer 112 in the context of FIG. 1, the distributed resource scheduling layer 112 is configured to pause a given one of the applications utilizing a first container resource and to restart the given application utilizing a second container resource, so as to thereby migrate the given application from the first container resource to the second container resource. Other types of live or offline migration of client applications are possible utilizing the distributed resource scheduling layer 112 and its underlying resource abstraction layer 114 in the FIG. 1 embodiment.

Additionally or alternatively, the distributed resource scheduling layer 112 can be configured to dynamically switch between utilization of different ones of a plurality of distinct scheduling algorithms supported by that layer in scheduling processing operations for different ones of the client applications.

Various aspects of the functionality of the distributed resource scheduling layer 112 can be controlled at least in part based on user input. For example, as indicated previously, a "drag-and-drop" interface of the distributed resource scheduling layer can be configured to allow a given user to move an associated client application from one container or virtual machine to another container or virtual machine.

Figure 2:
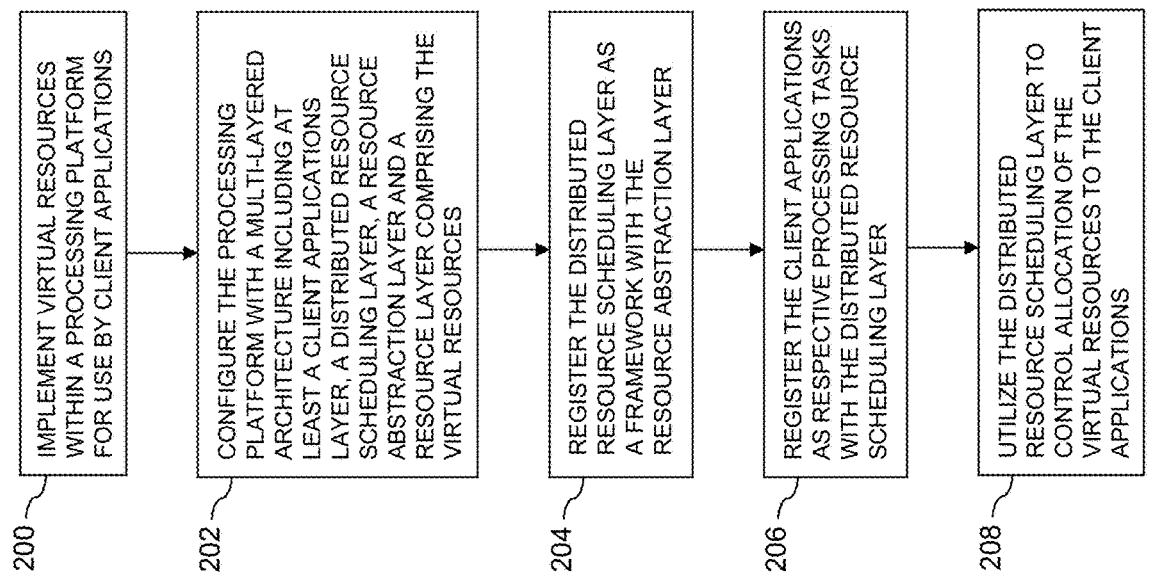
FIG. 2 is a flow diagram of an example process utilizing a distributed resource scheduling layer in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a processing platform comprising a multi-layered architecture for execution of client applications utilizing virtual resources. For example, the ordering of the process steps may be varied in other embodiments, or certain steps may be performed concurrently with one another rather than serially. Also, one or more of the process steps may be repeated periodically for different processing instances, or multiple such instances of the process may be performed at least in part in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3, 4 and 5. Each of these embodiments includes an information processing system having a multi-layered architecture that includes a distributed resource scheduling layer of the type described above.

Referring now to FIG. 3, an information processing system 300 comprises a processing platform having a multi-layered architecture that includes a client applications layer 310, a distributed resource scheduling layer 312 also denoted as Layer X, a resource abstraction layer 314 illustratively implemented as a Mesos layer, and a resource layer 316. The client applications layer 310 in this embodiment illustratively includes various application instances including Kubernetes, Chronos, Spark and Marathon applications. The resource layer 316 in this embodiment illustratively includes various sets of virtual resources, including Docker containers, virtual resources associated with execution of Hadoop, Chronos, Spark and Marathon applications, and other resources.

The distributed resource scheduling layer 312 in the FIG. 3 embodiment is configured to interface with one or more sources providing multiple scheduling algorithms 320. For example, the distributed resource scheduling layer 312 can load a different scheduling algorithm for use with a particular client application responsive to user input provided via the above-noted graphical user interface. Thus, in some embodiments, the distributed resource scheduling layer 312 is illustratively configured to allow a user to select a particular scheduling algorithm from multiple such scheduling algorithms supported by the system. Additionally or alternatively, such scheduling algorithms can be preselected for use with particular types of client applications, or can be dynamically varied under the control of the distributed resource scheduling layer. Although the multiple scheduling algorithms 320 are shown as separate from the distributed resource scheduling layer 312 in this embodiment, such algorithms may be incorporated within the distributed resource scheduling layer 312 in other embodiments.

FIG. 4 shows another illustrative embodiment, comprising a portion of an information processing system 400. In this embodiment, a processing platform of the information processing system 400 comprises a multi-layered architecture that includes a distributed resource scheduling layer 412 and a resource abstraction layer 414. Additional layers such as a client applications layer and a resource layer are assumed to be included in the multi-layered architecture, but are omitted from the figure for simplicity of illustration.

In this embodiment, the multi-layered architecture further comprises a task provider interface 415A arranged between the client applications layer and the distributed resource scheduling layer 412, and a resource provider interface arranged between the distributed resource scheduling layer 412 and the resource abstraction layer 414.

It should be noted that a given embodiment can include multiple instances of at least one of the task provider interface 415A and the resource provider interface 415B.

An example of an embodiment that includes multiple distinct resource providers having respective distinct resource provider interfaces is shown in FIG. 5. In this embodiment, an information processing system 500 comprises a processing platform having a multi-layered architecture that includes a client applications layer 510, a distributed resource scheduling layer 512 also denoted as Layer X, a resource abstraction layer comprising first and second resource abstraction frameworks 514-1 and 514-2 illustratively implemented as respective Mesos and Cloud Foundry Diego frameworks, and a resource layer 516.

The client applications layer 510 in this embodiment illustratively includes various application instances including Cloud Foundry or "CF" applications, as well as Kubernetes, Chronos, Spark and Marathon applications of the FIG. 3 embodiment.

The resource layer 516 in this embodiment illustratively includes various sets of virtual resources, including Docker containers and virtual resources associated with execution of Hadoop, Chronos, Spark and Marathon applications under the Mesos framework 514-1, as in the FIG. 3 embodiment, as well additional virtual resources including Cloud Foundry Garden resources and other resources under the Diego framework 514-2. The Mesos framework 514-1 and the Diego framework 514-2 are also referred to herein as respective first and second resource abstraction frameworks of a resource abstraction layer.

The multi-layer architecture in the FIG. 5 embodiment also includes a task provider interface 515A arranged between the distributed resource scheduling layer 512 and the client applications layer 510.

The multi-layer architecture in this embodiment further comprises a first resource provider interface 515B-1 arranged between the distributed resource scheduling layer 512 and the first resource abstraction framework 514-1 and a second resource provider interface 515B-2 arranged between the distributed resource scheduling layer 512 and the second resource abstraction framework 514-2.

The distributed resource scheduling layer 512 in the FIG. 5 embodiment is configured to interface with one or more sources providing multiple scheduling algorithms 520. For example, as in the FIG. 3 embodiment, the distributed resource scheduling layer 512 can load a different scheduling algorithm for use with a particular client application responsive to user input provided via the above-noted graphical user interface.

The FIG. 5 embodiment illustrates that the functionality of the distributed resource scheduling layer 512 can be advantageously distributed over multiple resource abstraction frameworks of different types. These abstraction frameworks include a Mesos framework as well as one or more additional frameworks, such as Cloud Foundry Diego, that are not currently integrated with Mesos.

Illustrative embodiments can provide considerable advantages over conventional container arrangements.

For example, some embodiments provide client-aware, efficient scheduling that can better allocate virtual resources across multiple otherwise unrelated client applications, leading to better resource utilization in a data center or other type of information processing system.

Also, illustrative embodiments can provide highly dynamic adjustments in resource allocation between client applications, based on processing loads and other factors. Such allocation decisions can be made using any of a wide variety of scheduling algorithms, as selected based on user input and other conditions.

In addition, illustrative embodiments do not require clients to reconfigure their applications in any way. For example, in some embodiments, a distributed resource scheduling layer presents clients with an API that is substantially the same as the API that would be presented by a Mesos resource abstraction framework, such that clients are provided with the additional functionality of the distributed resource scheduling layer in a seamless manner.

Another advantage of some embodiments is that such embodiments are configured to support live migration of client applications from one container, virtual machine or other set of virtual resources to another.

Accordingly, certain drawbacks of conventional approaches are avoided, as illustrative embodiments can eliminate the problems of conventional resource abstraction frameworks such as Mesos and Fenzo.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention, such as portions of the information processing systems 300, 400 and 500 of respective FIGS. 3, 4 and 5.

Figure 6:
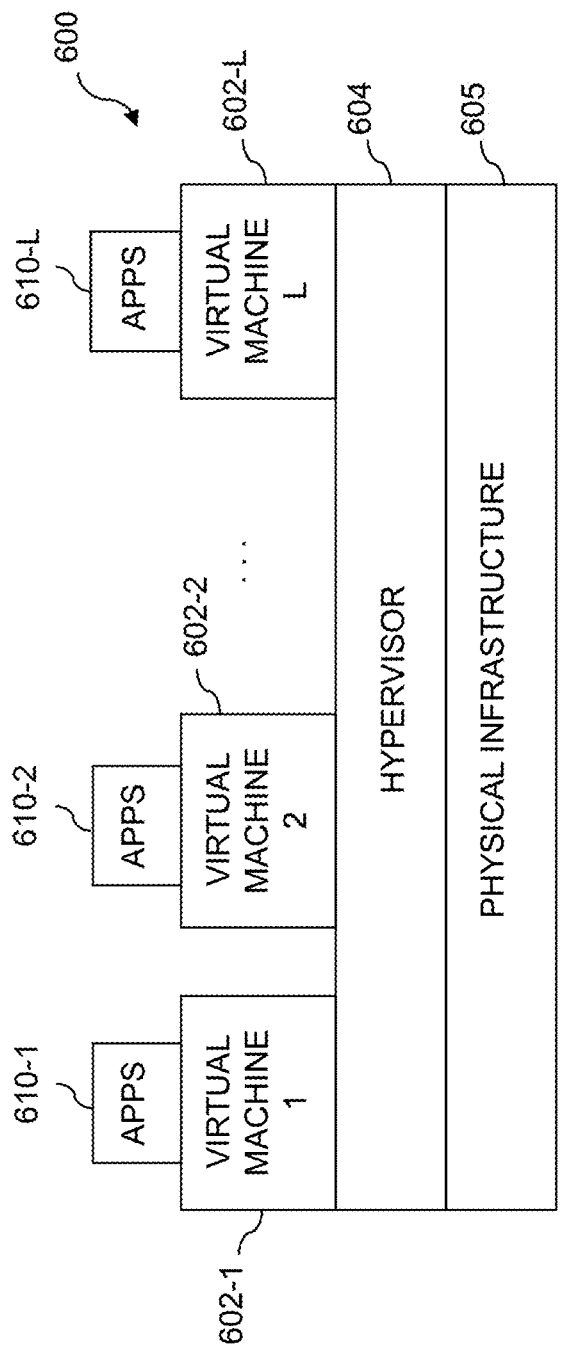
FIGS. 6 and 7 show examples of processing platforms that may be utilized to implement at least a portion of a given one of the information processing systems of FIGS. 1 and 3-5.
Figure 7:
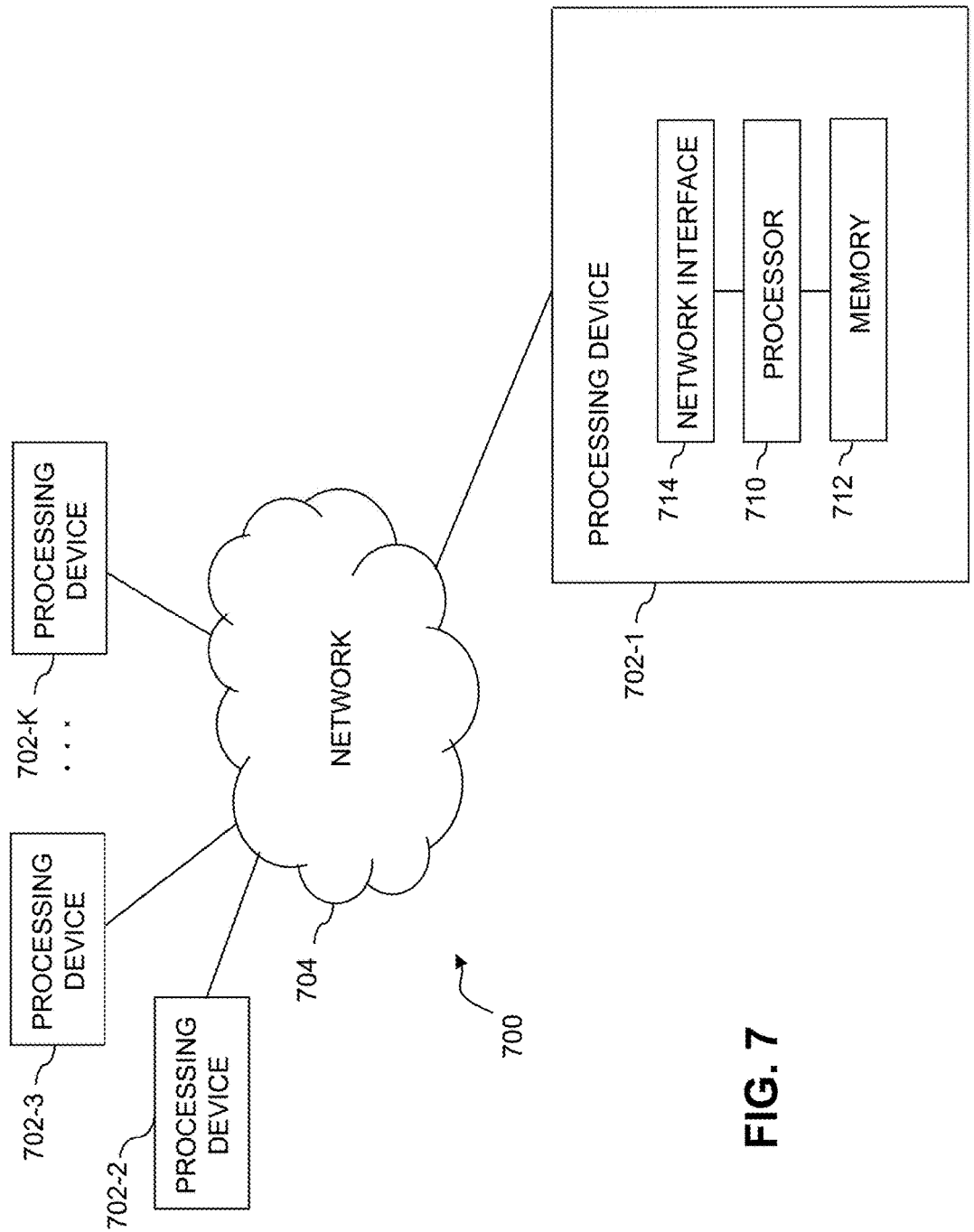

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the information processing system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an ASIC, a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide the above-noted Docker containers or other types of LXCs.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to facilitate efficient and flexible scheduling of client applications on virtual resources. Also, the particular configurations of system and device elements shown in the figures can be varied in other embodiments. Thus, for example, the particular types of processing platforms, layered architectures and virtual resources deployed in a given embodiment and their respective configurations may be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

What is claimed is:

1. An apparatus comprising:
   a processing platform comprising a plurality of processing devices each comprising a processor coupled to a memory;

the processing platform being configured to implement virtual resources for use by client applications;
the processing platform being further configured with a multi-layered architecture including at least:
a client applications layer;
a distributed resource scheduling layer;
a resource abstraction layer; and
a resource layer comprising the virtual resources;
the distributed resource scheduling layer being configured to registers as a framework with the resource abstraction layer;
the client applications being configured to register as respective processing tasks with the distributed resource scheduling layer; and
the distributed resource scheduling layer being further configured to control allocation of the virtual resources of the resource layer to the client applications;
the virtual resources comprising first virtual resources of a first type, the first virtual resources of the first type comprising respective container resources implemented using kernel control groups;
the virtual resources further comprising at least second virtual resources of a second type different than the first type, the second virtual resources of the second type comprising respective non-container resources;
the resource abstraction layer being configured to present abstractions of both the first and second virtual resources of the respective first and second types to the distributed resource scheduling layer.

2. The apparatus of claim 1 wherein the virtual resources comprise a plurality of containers allocable to respective ones of the client applications under the control of the distributed resource scheduling layer.

3. The apparatus of claim 2 wherein the distributed resource scheduling layer is configured to pause a given one of the applications utilizing a first container resource and to restart the given application utilizing a second container resource so as to migrate the given application from the first container resource to the second container resource.

4. The apparatus of claim 1 wherein the virtual resources comprise a plurality of virtual machines allocable to respective ones of the client applications under the control of the distributed resource scheduling layer.

5. The apparatus of claim 1 wherein the distributed resource scheduling layer is configured to support a plurality of distinct scheduling algorithms and to dynamically switch between utilization of different ones of the scheduling algorithms in scheduling processing operations for different ones of the client applications.

6. The apparatus of claim 1 wherein the distributed resource scheduling layer is configured to dynamically adjust portions of the virtual resources allocated to different ones of the client applications as a function of relative processing loads of the respective different ones of the client applications.

7. The apparatus of claim 1 wherein the distributed resource scheduling layer is configured to present to the client applications an application programming interface that is substantially the same as that which would otherwise be presented to the client applications by the resource abstraction layer if the distributed resource scheduling layer were removed from the multi-layered architecture.

8. The apparatus of claim 1 wherein the multi-layered architecture further comprises at least one task provider interface arranged between the client applications layer and the distributed resource scheduling layer.

9. The apparatus of claim 1 wherein the multi-layered architecture further comprises at least one resource provider interface arranged between the distributed resource scheduling layer and the resource abstraction layer.

10. The apparatus of claim 1 wherein the resource abstraction layer comprises a plurality of distinct resource abstraction frameworks and further wherein the multi-layered architecture comprises a first resource provider interface arranged between the distributed resource scheduling layer and a first one of the resource abstraction frameworks and a second resource provider interface arranged between the distributed resource scheduling layer and a second one of the resource abstraction frameworks.

11. An information processing system comprising the apparatus of claim 1.

12. A method comprising:
configuring a processing platform to include a plurality of processing devices each comprising a processor coupled to a memory;
implementing virtual resources within the processing platform for use by client applications;
the processing platform being configured with a multi-layered architecture including at least:
a client applications layer;
a distributed resource scheduling layer;
a resource abstraction layer; and
a resource layer comprising the virtual resources;
the method further comprising:
the distributed resource scheduling layer registering as a framework with the resource abstraction layer;
the client applications registering as respective processing tasks with the distributed resource scheduling layer; and
the distributed resource scheduling layer controlling allocation of the virtual resources of the resource layer to the client applications;
the virtual resources comprising first virtual resources of a first type, the first virtual resources of the first type comprising respective container resources implemented using kernel control groups;
the virtual resources further comprising at least second virtual resources of a second type different than the first type, the second virtual resources of the second type comprising respective non-container resources;
the resource abstraction layer being configured to present abstractions of both the first and second virtual resources of the respective first and second types to the distributed resource scheduling layer.

13. The method of claim 12 further comprising dynamically switching in the distributed resource scheduling layer between utilization of different ones of a plurality of distinct scheduling algorithms supported by that layer in scheduling processing operations for different ones of the client applications.

14. The method of claim 12 further comprising dynamically adjusting in the distributed resource scheduling layer portions of the virtual resources allocated to different ones of the client applications as a function of relative processing loads of the respective different ones of the client applications.

15. The method of claim 12 wherein the virtual resources comprise a plurality of containers allocable to respective ones of the client applications under the control of the distributed resource scheduling layer, the method further comprising:
pausing a given one of the applications utilizing a first container resource; and restarting the given application utilizing a second container resource;

wherein the pausing and restarting are performed in the distributed resource scheduling layer so as to migrate the given application from the first container resource to the second container resource.

16. The method of claim 12 further comprising:

providing in the multi-layered architecture at least one task provider interface arranged between the client applications layer and the distributed resource scheduling layer; and providing in the multi-layered architecture at least one resource provider interface arranged between the distributed resource scheduling layer and the resource abstraction layer.

17. A computer program product comprising a non-transitory processor-readable storage medium having stored therein program code of one or more software programs, wherein the program code when executed by a processing platform comprising a plurality of processing devices causes the processing platform:

to implement virtual resources for use by client applications;

the processing platform being configured with a multi-layered architecture including at least:

a client applications layer;

a distributed resource scheduling layer;

a resource abstraction layer; and a resource layer comprising the virtual resources;

the distributed resource scheduling layer being configured to register as a framework with the resource abstraction layer;

the client applications being configured to register as respective processing tasks with the distributed resource scheduling layer; and the distributed resource scheduling layer being further configured to controls allocation of the virtual resources of the resource layer to the client applications;

the virtual resources comprising first virtual resources of a first type, the first virtual resources of the first type comprising respective container resources implemented using kernel control groups;

the virtual resources further comprising at least second virtual resources of a second type different than the first type, the second virtual resources of the second type comprising respective non-container resources;

the resource abstraction layer being configured to present abstractions of both the first and second virtual resources of the respective first and second types to the distributed resource scheduling layer.

18. The computer program product of claim 17 wherein the program code when executed further causes the processing platform to dynamically switch in the distributed resource scheduling layer between utilization of different ones of a plurality of distinct scheduling algorithms supported by the distributed resource scheduling layer in scheduling processing operations for different ones of the client applications.

19. The computer program product of claim 17 wherein the program code when executed further causes the processing platform to dynamically adjust in the distributed resource scheduling layer portions of the virtual resources allocated to different ones of the client applications as a function of relative processing loads of the respective different ones of the client applications.

20. The computer program product of claim 17 wherein the virtual resources comprise a plurality of containers allocable to respective ones of the client applications under the control of the distributed resource scheduling layer, and wherein the program code when executed further causes the processing platform:

to pause a given one of the applications utilizing a first container resource; and to restart the given application utilizing a second container resource;

wherein the pausing and restarting are performed in the distributed resource scheduling layer so as to migrate the given application from the first container resource to the second container resource.

* * * * *